(12) United States Patent
Kern et al.

(10) Patent No.: US 7,940,696 B2
(45) Date of Patent: May 10, 2011

(54) REMOTELY BOOTING COMPUTING NODES IN A SWITCHING DOMAIN

(75) Inventors: Eric R. Kern, Chapel Hill, NC (US); William G. Pagan, Durham, NC (US); Norman C. Strole, Raleigh, NC (US)

(73) Assignee: International Business Macines Corporation, Armonk, NY (US)

( * ) Notice: Subject to any disclaimer, the term of this patent is extended or adjusted under 35 U.S.C. 154(b) by 364 days.

(21) Appl. No.: 11/960,870

(22) Filed: Dec. 20, 2007

(65) Prior Publication Data

US 2009/0161667 A1 Jun. 25, 2009

(51) Int. Cl.
H04L 12/28 (2006.01)

(52) U.S. Cl. .................... 370/254; 370/255

(58) Field of Classification Search .............. None
See application file for complete search history.

(56) References Cited

U.S. PATENT DOCUMENTS

| | | | | |
|---|---|---|---|---|
| 4,953,159 | A * | 8/1990 | Hayden et al. | 370/265 |
| 7,280,816 | B2 * | 10/2007 | Fratti et al. | 455/405 |
| 7,571,332 | B2 * | 8/2009 | Cromer et al. | 713/310 |
| 2002/0037718 | A1 | 3/2002 | Watanabe | |
| 2003/0206564 | A1 | 11/2003 | Mills et al. | |
| 2005/0066022 | A1 | 3/2005 | Liebenow | |
| 2005/0229160 | A1 | 10/2005 | Rothman et al. | |
| 2006/0225129 | A1 | 10/2006 | Inoue | |
| 2009/0287812 | A1 * | 11/2009 | Weber et al. | 709/224 |

FOREIGN PATENT DOCUMENTS

EP  1 494 401 A2  1/2005

* cited by examiner

Primary Examiner — Robert W Wilson
(74) Attorney, Agent, or Firm — H. Barrett Spraggins; Cynthia G. Seal; Biggers & Ohanian, LLP (57) ABSTRACT

Methods, apparatus, and products are disclosed for remotely booting computing nodes in a switching domain, the switching domain capable of connecting to other switching domains through a network switch, that include: receiving, in the switch, a wakeup request packet that requests activation of one or more computing nodes in the switching domain, the wakeup request packet having a process port value specifying physical ports on the switch to which the one or more computing nodes are physically connected; identifying, by the switch, a network address for each computing node in dependence upon the physical port on the switch to which each computing node to be activated is physically connected; generating, by the switch, a wakeup packet for each computing node in dependence upon the identified network address for that computing node; and transmitting, by the switch to each computing node to be activated, the wakeup packet for that computing node.

15 Claims, 4 Drawing Sheets

REMOTELY BOOTING COMPUTING NODES IN A SWITCHING DOMAIN

BACKGROUND OF THE INVENTION

1. Field of the Invention

The field of the invention is data processing, or, more specifically, methods, apparatus, and products for remotely booting computing nodes in a switching domain.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems and networks today that are much more ubiquitous and powerful than just a few years ago.

As these computer systems and networks have advanced, system administrators have developed tools to better manage these computer systems. One such tool is the Wake-On-LAN mechanism that provides a system administrator with the ability to remotely activate a computer system that has been shut down. Due to security, power conservation, or other concerns, users often turn off their computers when anticipating a long period of non-use. Using the Wake-On-LAN mechanism provides system administrators with the flexibility to allow users to turn off their computers but retain the system administrator's ability to backup or upgrade the computer system remotely during those periods of non-use when the computer is often shut down.

The Wake-On-LAN mechanism operates by reserving a relatively small amount of power for a computer's network adapter while the computer is shut down. The network adapter listens for a specific wakeup packet, often referred to as the 'magic packet,' that is transmitted from some other administrative computer on the network. The wakeup packet is typically implemented as a User Datagram Protocol ('UDP') packet that is broadcast on the network subnet's broadcast address. The data that is contained in a wakeup packet is a defined constant as represented in hexadecimal as 'FF FF FF FF FF FF' followed by sixteen repetitions of a Media Access Control ('MAC') address for the computer system to be activated, which may be further followed by a four or six byte password. Upon receiving the wakeup packet, the network adapter validates the wakeup packet. If the wakeup packet is valid, the network adapter may signal the computer system's Basic Input/Output System ('BIOS') to turn on power to the other components of the computer and initiate the boot sequence. Readers will note that although the acronym 'LAN' in 'Wake-On-LAN' refers to a 'Local Area Network,' the Wake-On-LAN mechanism is not restricted for use only within a LAN. Rather, a system administrator may utilize the Wake-On-LAN mechanism across different types of networks including Wide Area Networks ('WAN') or the Internet.

The drawback to the current Wake-On-LAN mechanism, however, is that the computer to be activated is often installed behind a firewall that does not permit broadcast network traffic to pass through to the computers behind the firewall. As such, the wakeup packet never reaches the computer to be activated. Another drawback to the current Wake-On-LAN mechanism is that the system administrator often does not know the MAC address for the computer to be activated. Without such knowledge of the computer's MAC address, a wakeup packet cannot be generated.

SUMMARY OF THE INVENTION

Methods, apparatus, and products are disclosed for remotely booting computing nodes in a switching domain, the switching domain capable of connecting to other switching domains through a network switch, that include: receiving, in the network switch, a wakeup request packet that requests activation of one or more computing nodes in the switching domain, the wakeup request packet having a process port value that specifies physical ports on the network switch to which the one or more computing nodes are physically connected; identifying, by the network switch, a network address for each computing node to be activated in dependence upon the physical port on the network switch to which each computing node to be activated is physically connected; generating, by the network switch, a wakeup packet for each computing node to be activated in dependence upon the identified network address for that computing node, each wakeup packet instructing one of the computing nodes to activate; and transmitting, by the network switch, to each computing node to be activated, the wakeup packet for that computing node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
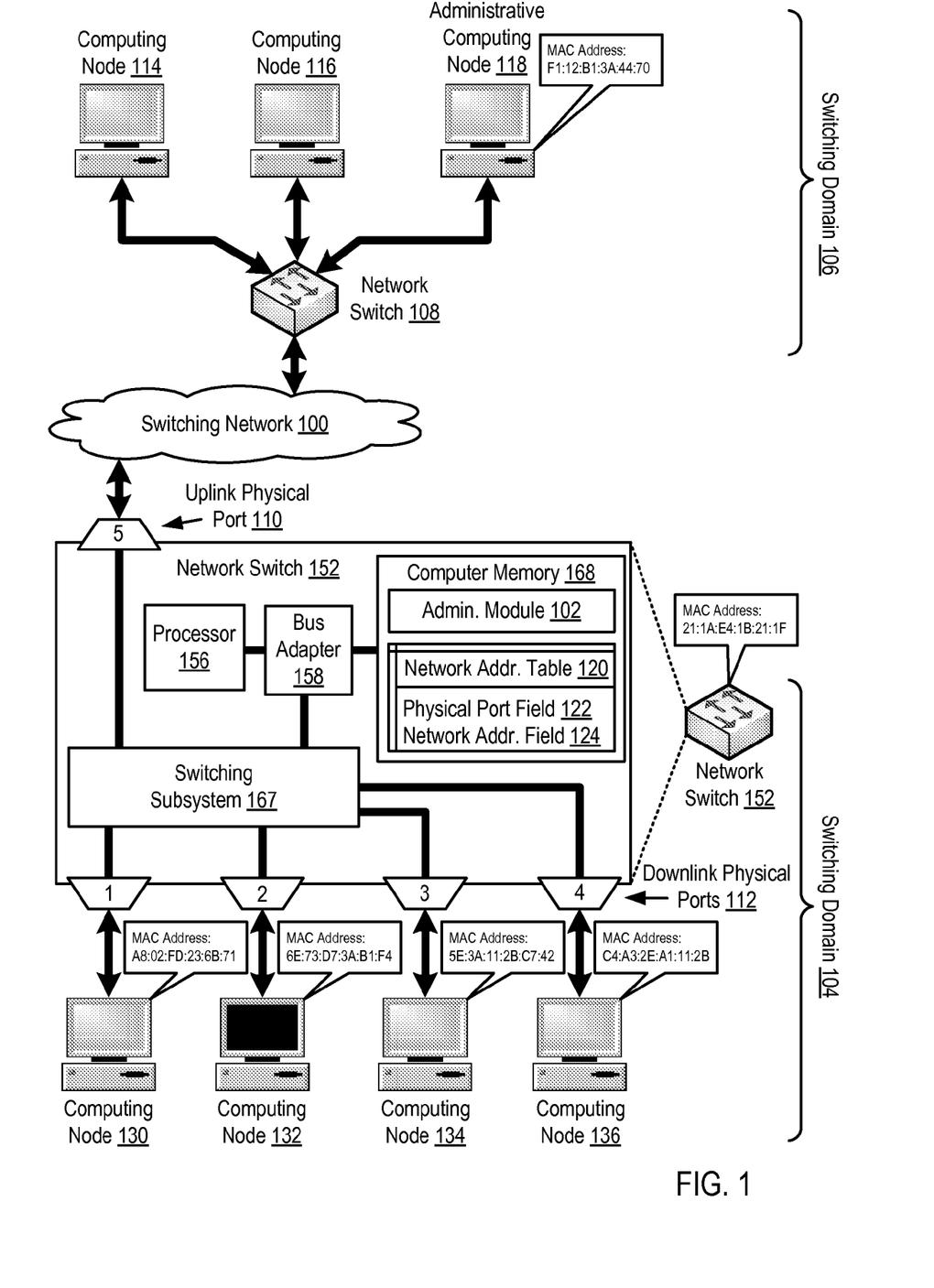
FIG. 1 sets forth a functional block diagram of an exemplary system capable of remotely booting computing nodes in a switching domain according to embodiments of the present invention.

Exemplary methods, apparatus, and products for remotely booting computing nodes in a switching domain in accordance with the present invention are described with reference to the accompanying drawings, beginning with FIG. 1. FIG. 1 sets forth a functional block diagram of an exemplary system capable of remotely booting computing nodes in a switching domain (104) according to embodiments of the present invention. A 'switching domain' in this specification refers to a portion of a computer network that includes a single network switch and the computing nodes connected to that switch through network segments.

The switching domain (104) of FIG. 1 is composed of a network switch (152) and computing nodes (130, 132, 134, 136), which are connected to the network switch (152) through downlink physical ports (112) numbered '1,' '2', '3,' and '4' respectively. The physical ports (112) are referred to as 'downlink' ports because the ports are directly connected to a computing node rather than another network device such as a switch. In the example of FIG. 1, the switching domain (104) is connected to another switching domain (106) through an up link physical port (110) numbered '5' on the network switch (152), which is in turn connected to the other switching domain (106) through switching network (100). The physical port (110) is referred to as an 'uplink' port because the port is connected to a network device that administers network traffic for a multitude of computing nodes rather than being directly connected to a computing node.

The other switching domain (106) of FIG. 1 is composed of a network switch (108), computing nodes (114, 116) connected to the network switch (108), and an administrative computing node (118) connected to the network switch (108). The administrative computing node (118) is a computing node that manages the other nodes (114, 116, 130, 132, 134, 136) to which the administrative computing node (118) is connected through the switching network (100). The administrative node (118) may, for example, provide nightly backup services or software upgrade services for the other nodes (114, 116, 130, 132, 134, 136).

The network switch (152) in the example of FIG. 1 is a computing device that inspects data packets as the packets are received, determines the destination node for each packet, and forwards each packet to the appropriate destination device through the corresponding physical port (110, 112) of the switch (152). By delivering each packet only to the connected device for which the packet is destined, a network switch conserves network bandwidth and generally offers better performance than a hub. A physical port is physical interface and the signaling components used to receive and transmit data between the switch (152) and each of the devices connected to the switch's physical ports (110, 112). An example of a physical port may include an Ethernet™ port, but readers will note that such a port is for explanation only and not for limitation.

In the example of FIG. 1, the network switch (152) includes a processor (156) connected to computer memory (168) and connected to a switching subsystem (167) through bus adapter (158). The computer memory (168) includes a switch administration module (102) that is a set of computer program instructions for controlling the network switch (152). The switching subsystem (167) provides the hardware components used to receive, route, and transmit packets among the nodes connected to the switch (152). Through the switching subsystem (167), the switch (152) receives packets from nodes through the physical ports 1, 2, 3, 4, or 5 and identifies the destination address for each packet. The switch (152) then utilizes a network address table (120) stored in memory (168) to determine the switch's physical port associated with destination address for each packet and forward each packet to the corresponding physical port for the destination node.

The network address table (120) of FIG. 1 is a data structure that associates network addresses with the switch's physical ports. Each record in the network address table (120) includes a physical port field (122) and a network address field (124). The physical port field (122) specifies a physical port to which a computing node is connected to the switch (152). The network address field (124) specifies the network address for the computing node connected to the associated physical port. The network address may be implemented as a MAC address for the computing device, but readers will note that any network address as will occur to those of skill in the art may also be used, including an IP address. For further explanation, consider the following exemplary network address table:

TABLE 1

EXEMPLARY NETWORK ADDRESS TABLE

| PHYSICAL PORT FIELD | NETWORK ADDRESS FIELD |
| --- | --- |
| 1 | A8:02:FD:23:6B:71 |
| 2 | 6E:73:D7:3A:B1:F4 |
| 3 | 5E:3A:11:2B:C7:42 |
| 4 | C4:A3:2E:A1:11:2B |
| 5 | EE:3C:11:7A:BA:13 |

The exemplary network address table above specifies that the computing node (130) having a network address of 'A8:02:FD:23:6B:71' is connected to the switch's physical port '1.' The computing node (132) having a network address of '6E:73:D7:3A:B1:F4' is connected to the switch's physical port '2.' The computing node (134) having a network address of '5E:3A:11:2B:C7:42' is connected to the switch's physical port '3.' The computing node (136) having a network address of 'C4:A3:2E:A1:11:2B' is connected to the switch's physical port '4.' Because the physical port '5' of the switch (152) is an uplink port to the switching network (100), physical port '5' is associated with the computing device, typically another switch, having a network address of 'EE:3C:11:7A:BA:13.' In the example of FIG. 1, the network switch (152) may populate the network address table (120) by monitoring the ports through which packets are received into the switch and associating network addresses in those packets' source network address field with the port through which the packets were received. Readers will note that the exemplary network address table above is for explanation only and not for limitation.

As mentioned above, the administrative computing node (118) of FIG. 1 manages the other nodes (114, 116, 130, 132, 134, 136) to which the administrative computing node (118) is connected through the switching network (100). In particular, the administrative node (118) of FIG. 1 operates to remotely boot the computing node (132) in the switching domain (104) according to embodiments of the present invention. The administrative node (118) of FIG. 1 may remotely boot the computing node (132) in the switching domain (104) according to embodiments of the present invention by creating a wakeup request packet and transmitting the wakeup request packet to the network switch (152). A wakeup request packet is a network packet that instructs a network switch to activate one or more computing nodes connected to the switch's physical ports. The wakeup request packet indicates which computing nodes are to be activated using a process port value included in the wakeup packet request. Although a process port typically specifies a particular process executing on a computing device that sends or receives a packet, readers will note that in exemplary embodiments of the present invention the process port field in a packet is overloaded such that the process port value also specifies physical ports on the network switch to which the one or more computing nodes to be activated are physically connected. The process port field may be overloaded by choosing a valid transport layer process port value that is not reserved or in common use according to the protocol used to construct the wakeup request packet. Such a value may be used to encode the numbers for the switch's physical ports to which nodes to be activated are connected. Consider, for example, that the wakeup request packet is constructed using the UDP protocol. Process port values from '49152' to '65535' are not reserved or in common use according to the UDP and may be used to encode the numbers for the switch's physical ports to which nodes to be activated are connected. The manner in which the switch's physical ports are encoded in the process port value is explained in further detail below with reference to FIGS. 2, 3, and 4.

As mentioned above, the payload of a traditional wakeup packet includes a defined constant as represented in hexadecimal as 'FF FF FF FF FF FF' followed by sixteen repetitions of a MAC address for the computer system to be activated. A wakeup request packet may be implemented as a modified wakeup packet that repeats the MAC address for network switch (152)—rather than the computing node (132). For further explanation, consider the following exemplary wakeup request packet transmitted by the administrative node (118) to the switch (152), instructing the switch (152) to activate computing node (132):

| EXEMPLARY WAKEUP REQUEST PACKET | | |
|---|---|---|
| MAC HEADER | Destination MAC Address: 21:1A:E4:1B:21:1F | Source MAC Address: F1:12:B1:3A:44:70 |
| IP HEADER | ... | |
| UDP HEADER | Source Process Port: 0 | Destination Process Port: 56002 |
| DATA | | FF:FF:FF:FF:FF:FF |
| | | 21:1A:E4:1B:21:1F |
| | | 21:1A:E4:1B:21:1F |
| | | 21:1A:E4:1B:21:1F |
| | | ... |

The exemplary wakeup request packet above is transmitted by the administrative computing node (118) to the network switch (152). The network switch (152) identifies the packet as a wakeup request packet because the data segment of the packet includes a defined constant as represented in hexadecimal as 'FF FF FF FF FF FF' followed by sixteen repetitions of a MAC address for the network switch (152). The process port value '56002' is overloaded to specify that the computing node for activation is connected to the switch (152) on physical port '2.' Readers will note that the exemplary wakeup request packet above is for explanation only and not for limitation.

As mentioned above, the network switch (152) includes a switch administration module (102) that controls the switch (152). In the example of FIG. 1, the switch administration module (102) includes a set of computer instructions that operate generally for remotely booting computing nodes in a switching domain according to embodiments of the present invention. The switch administration module (102) operates generally for remotely booting computing nodes in a switching domain according to embodiments of the present invention by: receiving a wakeup request packet that requests activation of one or more computing nodes in the switching domain (104), the wakeup request packet having a process port value that specifies physical ports on the network switch to which the one or more computing nodes are physically connected; identifying a network address for each computing node in dependence upon the physical port on the network switch to which each computing node is physically connected; generating a wakeup packet for each computing node in dependence upon the identified network address for that computing node, each wakeup packet instructing one of the computing nodes to activate; and transmitting, to each computing node, the wakeup packet for that computing node.

For further explanation, consider the exemplary wakeup request packet above specifying that the computing node for activation is connected to the switch (152) on physical port '2.' Upon receiving the exemplary wakeup request packet above, the network switch (152) may identify a network address of '6E:73:D7:3A:B1:F4' for the computing node (132) by looking up the network address associated with physical port '2' in the network address table (120). The network switch (152) may then generate a wakeup packet for the computing node (132) using the network address of '6E:73:D7:3A:B1:F4' and transmit the wakeup packet to the computing node (132) to instruct that computing node (132) to activate.

| EXEMPLARY WAKEUP PACKET | | |
|---|---|---|
| MAC HEADER | Destination MAC Address: 21:1A:E4:1B:21:1F | Source MAC Address: 6E:73:D7:3A:B1:F4 |
| IP HEADER | ... | |
| UDP HEADER | Source Process Port: 0 | Destination Process Port: 7 |
| DATA | | FF:FF:FF:FF:FF:FF |
| | | 6E:73:D7:3A:B1:F4 |
| | | 6E:73:D7:3A:B1:F4 |
| | | 6E:73:D7:3A:B1:F4 |
| | | ... |

The exemplary wakeup packet above is transmitted by the network switch (152) to the computing node (132). The computing node (132) identifies the packet as a wakeup packet because the data segment of the packet includes a defined constant as represented in hexadecimal as 'FF FF FF FF FF FF' followed by sixteen repetitions of a MAC address for the computing node (132). Upon receiving the exemplary wakeup packet above, the network adapter for the computing node (132) may instruct the node's BIOS to power on the node and begin the boot sequence. Readers will note that transmitting a wakeup request packet to the switch (152), which in turn transmits the wakeup packet to the computing node (132), allows the administrative node (118) to remotely boot the computing node (132) even when the node (132) is behind a firewall or the administrative node (118) does not have access to the node's MAC address.

The description of the wakeup request packets and wakeup packets above is explained in terms of the MAC data communications protocol, the Internet Protocol ('IP'), and UDP. Readers will note, however, that the use of the MAC protocol, IP and UDP is for explanation only and not for limitation. In fact, any data link layer protocol, network layer protocol, and transport layer protocol as will occur to those of ordinary skill in the art may be useful in remotely booting computing nodes in a switching domain according to embodiments of the present invention. The exemplary protocols mentioned in this specification are merely for explanation.

The arrangement or configuration of nodes and switch making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Ethernet, Transmission Control Protocol ('TCP'), IP, HyperText Transfer Protocol ('HTTP'), Wireless Access Protocol ('WAP'), Handheld Device Transport Protocol ('HDTP'), and others as will occur to those of skill in the art.

In addition, readers will note that arrangement of components and the architecture of the network switch in FIG. 1 are merely for explanation and not for limitation. Various embodiments of the present invention may be implemented on a variety of hardware platforms in addition to those illustrated in FIG. 1. Network switches useful in remotely booting computing nodes in a switching domain according to embodiments of the present invention may include additional components or different component architectures not shown in FIG. 1.

Figure 2:
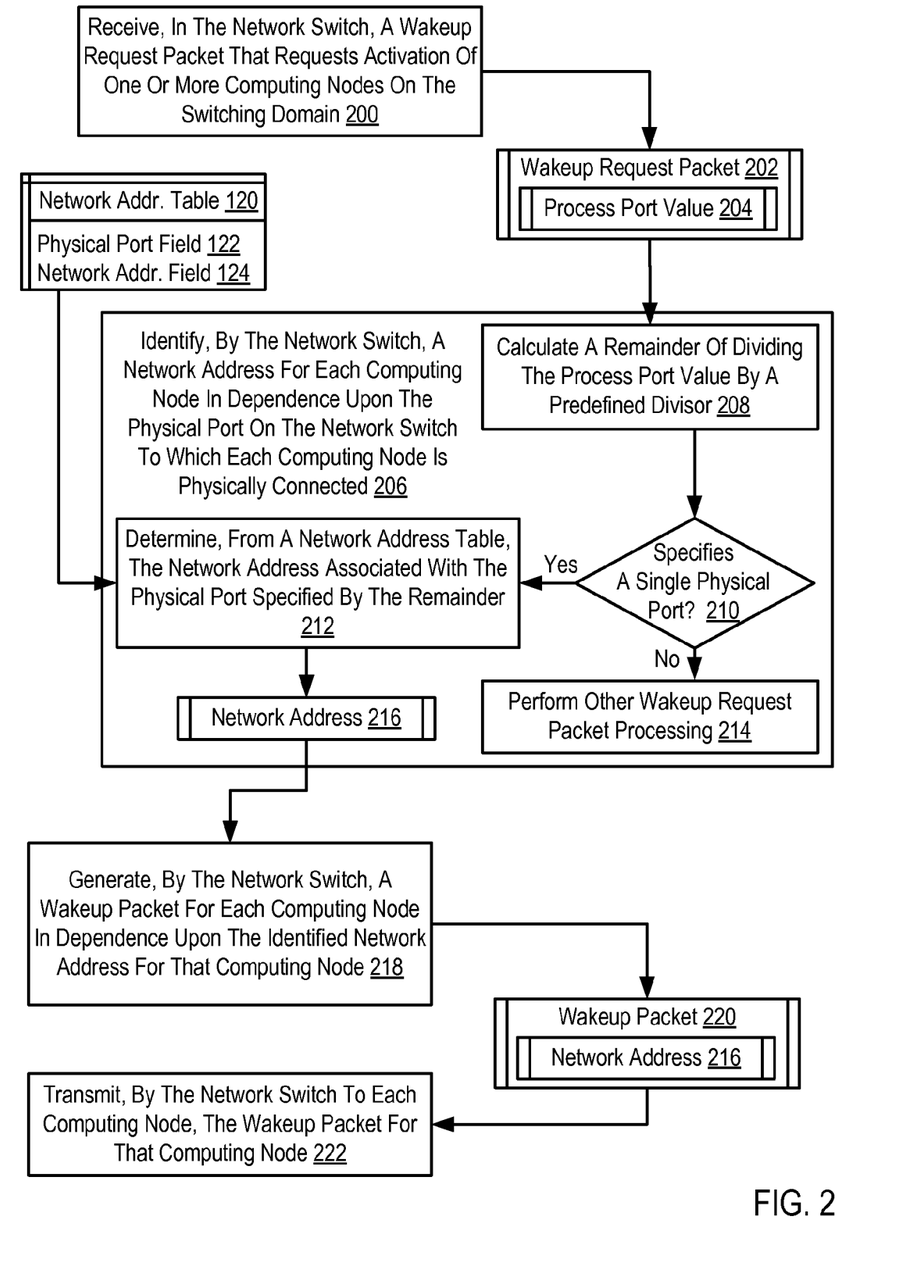
FIG. 2 sets forth a flow chart illustrating an exemplary method of remotely booting computing nodes in a switching domain according to embodiments of the present invention.

For further explanation, FIG. 2 sets forth a flow chart illustrating an exemplary method of remotely booting computing nodes in a switching domain according to embodiments of the present invention. The switching domain is capable of connecting to other switching domains through a network switch. The method of FIG. 2 includes receiving (200), in the network switch, a wakeup request packet (202) that requests activation of one or more computing nodes in the switching domain. The network switch may receive (200) a wakeup request packet (202) according to the method of FIG. 2 by receiving a packet through one of the switch's physical ports and determining whether the packet is a wakeup request packet (202). The network switch may determine whether the network packet is a wakeup request packet by identifying whether the packet's payload begins with the predefined constant represented in hexadecimal as 'FF FF FF FF FF FF,' followed by the switch's MAC address repeated sixteen times. If this information is contained in the packet's payload, then the packet is the wakeup request packet (202). The packet is not the wakeup request packet (202), however, if this information is not contained in the packet's payload.

In the example of FIG. 2, the wakeup request packet (202) requests activation of a single computing node in the switching domain. The wakeup request packet (202) of FIG. 2 has a process port value (204) that specifies physical port on the network switch to which the computing node is physically connected. For example consider again the exemplary wakeup request packet above:

| EXEMPLARY WAKEUP REQUEST PACKET | | |
|---|---|---|
| MAC HEADER | Destination MAC Address: 21:1A:E4:1B:21:1F | Source MAC Address: F1:12:B1:3A:44:70 |
| IP HEADER | | ... |
| UDP HEADER | Source Process Port: 0 | Destination Process Port: 56002 |
| DATA | | FF:FF:FF:FF:FF:FF |
| | | 21:1A:E4:1B:21:1F |
| | | 21:1A:E4:1B:21:1F |
| | | 21:1A:E4:1B:21:1F |
| | | ... |

As mentioned above, the process port value '56002' specifies physical port on the network switch to which the computing node is physically connected. Although the process port value '56002' is stored in the 'Destination Process Port' field in the UDP header of the exemplary wakeup request packet, readers will note that the process port value '56002' may also be stored in the 'Source Process Port' field in the packets' UDP header. Readers will further note that the use of UDP is for explanation only and not for limitation. In fact, other transport layer protocols as will occur to those of skill in the art may be used in embodiments of the present invention.

Readers will note that the exemplary wakeup request packet above is for explanation only and not for limitation.

The method of FIG. 2 includes identifying (206), by the network switch, a network address (216) for the computing node in dependence upon the physical port on the network switch to which each computing node is physically connected. The network switch identifies (206) a network address (216) for each computing node according to the method of FIG. 2 by calculating (208) a remainder of dividing the process port value (204) by a predefined divisor. The switch may calculate (208) the remainder according to the method of FIG. 2 by applying the modulo operator to the process port value and the predefined divisor. For further explanation, consider that the process port value is '56002' and the predefined divisor is '1000.' The network switch may calculate (208) a remainder of dividing the process port value by a predefined divisor as follows:

$$R = PPV \text{ MOD } D$$
$$= 56002 \text{ MOD } 1000$$
$$= 2$$

where R is the remainder, PPV is the processor port value (204), and D is the predefined divisor. In the example above, the remainder is '2.'

The network switch then identifies (206) a network address (216) for the computing node according to the method of FIG. 2 by determining (210) whether the remainder specifies a single physical port on the network switch. The network switch may determine (210) whether the remainder specifies a single physical port on the network switch according to the method of FIG. 2 by identifying whether the remainder matches the number for one of the physical ports on the switch. If the remainder matches the number for one of the physical ports on the switch, then the remainder specifies a single physical port on the network switch. The remainder does not specify a single physical port on the network switch, however, when the remainder does not match the number for one of the physical ports on the switch.

The network switch identifies (206) the network address (216) for the computing node according to the method of FIG. 2 by determining (212), from a network address table (120), the network address associated with the physical port specified by the remainder if the remainder specifies a single physical port on the network switch. The network address table (120) of FIG. 2 is a data structure that associates network addresses with the switch's physical ports. Each record in the network address table (120) includes a physical port field (122) and a network address field (124). The physical port field (122) specifies a physical port to which a computing node is connected to the switch (152). The network address field (124) specifies the network address for the computing node connected to the associated physical port. The network address may be implemented as a MAC address for the computing device, but readers will note that any network address as will occur to those of skill in the art may also be used, including an IP address. The network switch may determine (212) the network address associated with the physical port specified by the remainder according to the method of FIG. 2 by looking up the physical port in the physical port field (122) matching the remainder and identifying the network address associated with that physical port in the network address field (124).

The network switch also identifies (206) the network address (216) for the computing node according to the method of FIG. 2 by performing (214) other wakeup request packet processing if the remainder does not specify a single physical port on the network switch. Performing (214) other wakeup request packet processing according to the method of FIG. 2 may be carried out by processing wakeup request packets that request activation of more than one computing node in the switching domain as discussed below with reference to FIGS. 3 and 4.

The method of FIG. 2 includes generating (218), by the network switch, a wakeup packet (220) for the computing node in dependence upon the identified network address (216) for that computing node. The wakeup packet (220) is a network packet that instructs the computing node to activate. The network switch may generate (218) a wakeup packet (220) for the computing node according to the method of FIG. 2 by inserting a payload into a packet that begins with the predefined constant in hexadecimal 'FF FF FF FF FF FF,' followed by the MAC address of the computing node to be activated in repetition fifteen times.

The method of FIG. 2 also includes transmitting (222), by the network switch to the computing node, the wakeup packet (220) for that computing node. The network switch may transmit (222) the wakeup packet (220) to the computing node to be activated according to the method of FIG. 2 by injecting the wakeup packet (220) into a transmission buffer for the physical port on the switch to which that computing node is connected. Upon receiving the wakeup packet (220), the computing node's network adapter instructs the node's BIOS to active the computing node. Activating the computing node refers to the process of booting up the computing node from a powered off state, resuming operation from a sleep mode, or any other process of returning to the computing node to a processing state in which the node's general purpose processor is capable of executing computer program instructions.

As mentioned above, the wakeup request packet described above with reference to FIG. 2 requests activation of a single computing node on a particular switching domain. In other embodiments, a single wakeup request packet may request that a network switch activate all computing nodes on a particular switching domain. For further explanation, therefore, consider FIG. 3 that sets forth a flow chart illustrating a further exemplary method of remotely booting computing nodes in a switching domain according to embodiments of the present invention. The switching domain described with reference to FIG. 3 is capable of connecting to other switching domains through a network switch.

Figure 3:
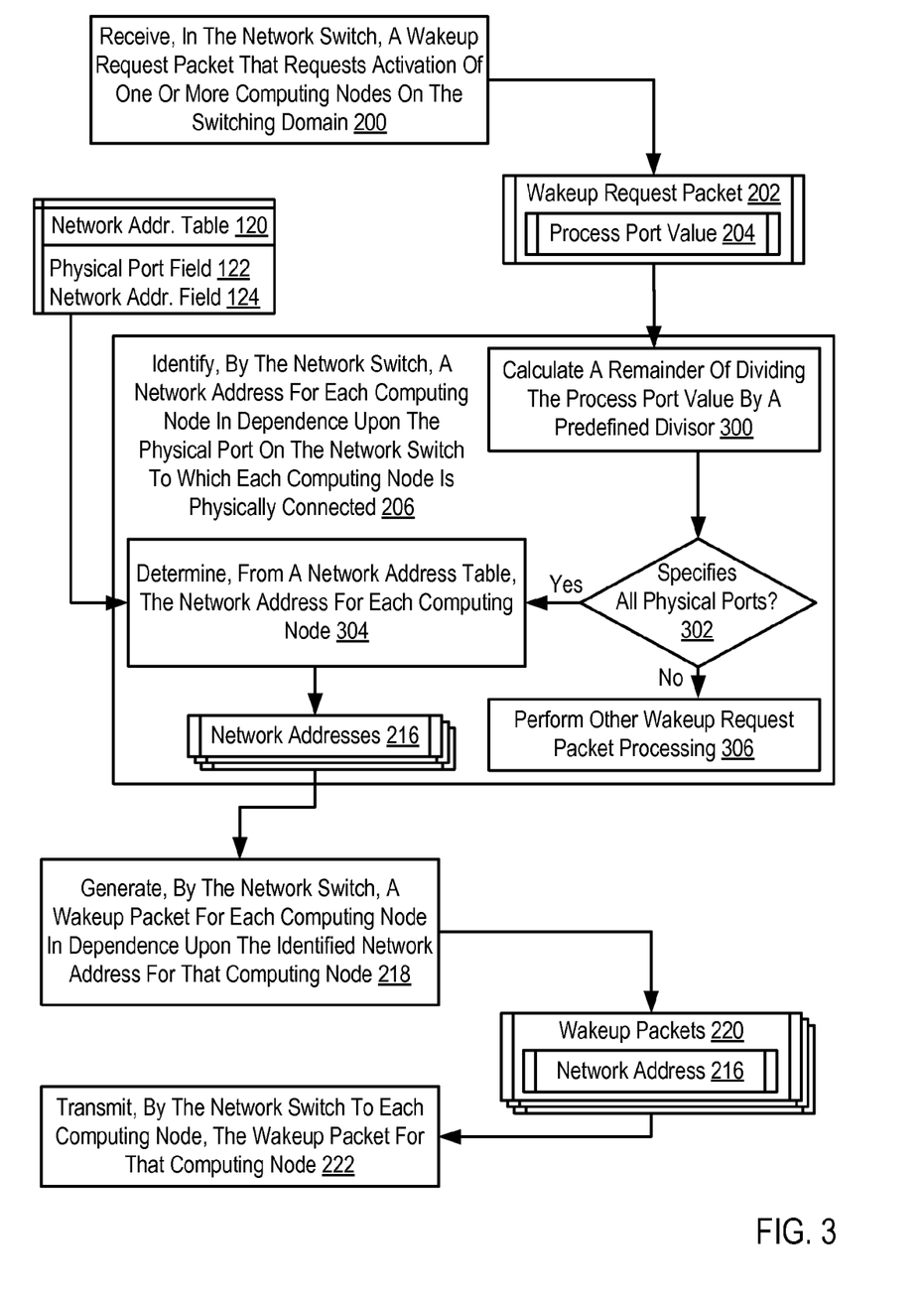
FIG. 3 sets forth a flow chart illustrating a further exemplary method of remotely booting computing nodes in a switching domain according to embodiments of the present invention.

The method of FIG. 3 is similar to the method of FIG. 2. That is, the method of FIG. 3 includes: receiving (200), in the network switch, a wakeup request packet (202) that requests activation of one or more computing nodes in the switching domain, the wakeup request packet (202) having a process port value (204) that specifies physical ports on the network switch to which the one or more computing nodes are physically connected; identifying (206), by the network switch, a network address (216) for each computing node in dependence upon the physical port on the network switch to which each computing node is physically connected; generating (218), by the network switch, a wakeup packet (220) for each computing node in dependence upon the identified network address (216) for that computing node, each wakeup packet instructing one of the computing nodes to activate; and transmitting (222), by the network switch to each computing node, the wakeup packet (220) for that computing node.

As mentioned above, the wakeup request packet (202) of FIG. 3 requests activation of all computing nodes in the switching domain. For example, consider the following exemplary wakeup request packet:

| EXEMPLARY WAKEUP REQUEST PACKET | | |
|---|---|---|
| MAC HEADER | Destination MAC Address: 21:1A:E4:1B:21:1F | Source MAC Address: F1:12:B1:3A:44:70 |
| IP HEADER | | ... |
| UDP HEADER | Source Process Port: 0 | Destination Process Port: 56999 |
| DATA | FF:FF:FF:FF:FF:FF 21:1A:E4:1B:21:1F 21:1A:E4:1B:21:1F 21:1A:E4:1B:21:1F ... | |

The exemplary wakeup request packet above is has a process port value of '56999' that specifies activating the computing nodes connected to all of the physical ports on the network switch. Readers will note that the exemplary wakeup request packet above is for explanation only and not for limitation.

In the method of FIG. 3, identifying (206), by the network switch, a network address (216) for each computing node includes calculating (300) a remainder of dividing the process port value by a predefined divisor. The switch may calculate (300) the remainder according to the method of FIG. 3 by applying the modulo operator to the process port value (204) and the predefined divisor. For further explanation, consider the exemplary process port value above of '56999' and that the predefined divisor is '1000.' The network switch may calculate (300) a remainder of dividing the process port value by a predefined divisor as follows:

$$R = PPV \bmod D$$
$$= 56999 \bmod 1000$$
$$= 999$$

where R is the remainder, PPV is the processor port value (204), and D is the predefined divisor. In the example above, the remainder is '999.'

Identifying (206), by the network switch, a network address (216) for each computing node includes according to the method of FIG. 3 also includes determining (302) whether the remainder specifies all of the physical ports on the network switch. Determining (302) whether the remainder specifies all of the physical ports on the network switch according to the method of FIG. 2 may be carried out by identifying whether the remainder matches a predetermined code indicating that the switch is to transmit wakeup packets to all of the computing nodes in the switching domain. If the remainder matches a predetermined code, then the remainder specifies all of the computing nodes connected to the physical ports on the network switch are to be activated. The remainder does not specify all of the computing nodes connected to the physical ports on the network switch are to be activated, however, if the remainder does not match a predetermined code. For example, consider the exemplary wakeup request packet above used to calculate a remainder value of '999' and consider that the predetermined code was '999.' In such an example, the remainder specifies all of the computing nodes connected to the physical ports on the network switch are to be activated.

Identifying (206), by the network switch, a network address (216) for each computing node includes according to the method of FIG. 3 also includes determining (304), from a network address table (120), the network address for each computing node if the remainder specifies all of the physical ports on the network switch. As mentioned above, the network address table (120) of FIG. 3 is a data structure that associates network addresses with the switch's physical ports. Each record in the network address table (120) includes a physical port field (122) and a network address field (124). The network switch may determine (304) the network address for each computing node from a network address table (120) according to the method of FIG. 3 by looking up each network address associated with one of the downlink physical ports in the network address table (120).

Identifying (206), by the network switch, a network address (216) for each computing node includes according to the method of FIG. 3 also includes performing (306) other wakeup request packet processing if the remainder does not specify all of the physical ports on the network switch. Performing (214) other wakeup request packet processing according to the method of FIG. 3 may be carried out by processing wakeup request packets that request activation of less than all of the computing node in the switching domain as discussed with reference to FIGS. 2 and 4.

As mentioned above, the wakeup request packet described above with reference to FIG. 2 requests activation of a single computing node on a particular switching domain, and the wakeup request packet described above with reference to FIG. 3 requests activation of all computing nodes on a particular switching domain. In other embodiments, a wakeup request packet may request that a network switch activate a subset of all computing nodes in the switching domain that includes at least two nodes. For further explanation, therefore, consider FIG. 4 that sets forth a flow chart illustrating a further exemplary method of remotely booting computing nodes in a switching domain according to embodiments of the present invention. The switching domain described with reference to FIG. 4 is capable of connecting to other switching domains through a network switch.

Figure 4:
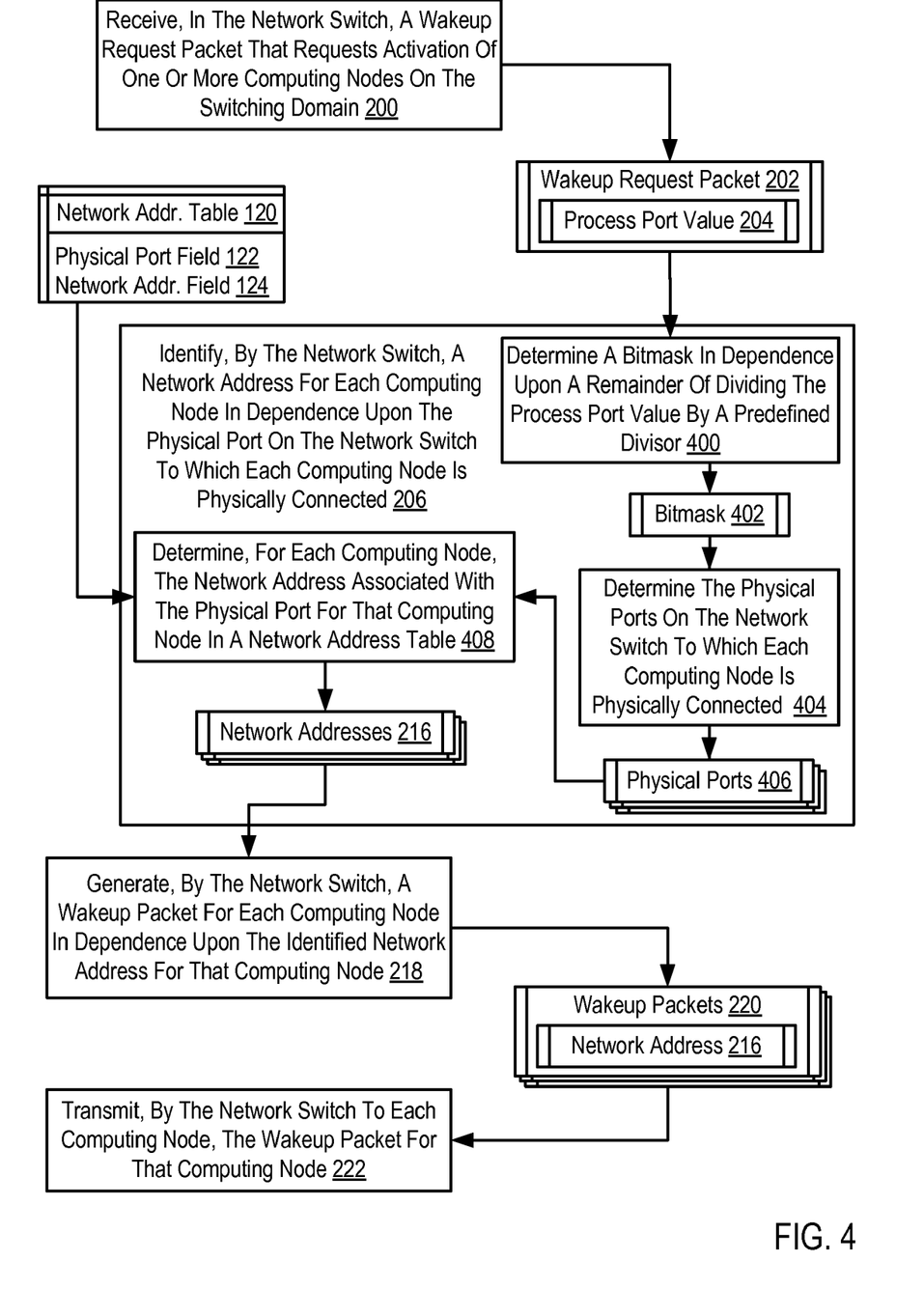
FIG. 4 sets forth a flow chart illustrating a further exemplary method of remotely booting computing nodes in a switching domain according to embodiments of the present invention.

The method of FIG. 4 is similar to the method of FIG. 2. That is, the method of FIG. 4 includes: receiving (200), in the network switch, a wakeup request packet (202) that requests activation of one or more computing nodes in the switching domain, the wakeup request packet (202) having a process port value (204) that specifies physical ports on the network switch to which the one or more computing nodes are physically connected; identifying (206), by the network switch, a network address (216) for each computing node in dependence upon the physical port on the network switch to which each computing node is physically connected; generating (218), by the network switch, a wakeup packet (220) for each computing node in dependence upon the identified network address (216) for that computing node, each wakeup packet instructing one of the computing nodes to activate; and transmitting (222), by the network switch to each computing node, the wakeup packet (220) for that computing node.

As mentioned above, the wakeup request packet (202) of FIG. 4 requests activation of a subset of all computing nodes in the switching domain. For example, consider the following exemplary wakeup request packet:

| EXEMPLARY WAKEUP REQUEST PACKET | | |
|---|---|---|
| MAC HEADER | Destination MAC Address: 21:1A:E4:1B:21:1F | Source MAC Address: F1:12:B1:3A:44:70 |
| IP HEADER | | ... |
| UDP HEADER | Source Process Port: 0 | Destination Process Port: 56005 |
| DATA | | FF:FF:FF:FF:FF:FF 21:1A:E4:1B:21:1F 21:1A:E4:1B:21:1F 21:1A:E4:1B:21:1F ... |

The exemplary wakeup request packet above is has a process port value of '56005' that specifies activating a subset of the computing nodes connected to the physical ports on the network switch. The process port value of '56005' is used to determine a bitmask that specifies the physical ports to which computing nodes to be activated are connected. Readers will note that the exemplary wakeup request packet above is for explanation only and not for limitation.

In the method of FIG. 4, identifying (206), by the network switch, a network address (216) for each computing node includes determining (400) a bitmask (402) in dependence upon a remainder of dividing the process port value by a predefined divisor. A network switch may determine (400) a bitmask (402) in dependence upon a remainder of dividing the process port value by a predefined divisor according to the method of FIG. 4 by calculating a remainder and identifying the bitmask (402) as the binary representation of the remainder. For example, consider the exemplary wakeup request packet above in which the remainder of dividing the process port value '56005' by a predefined divisor '1000' is '5.' The bitmask (402) of FIG. 4 may be implemented as the binary representation of '5,' which is '0101.'

Identifying (206), by the network switch, a network address (216) for each computing node according to the method of FIG. 4 includes determining (404) the physical ports on the network switch to which each computing node is physically connected in dependence upon the bitmask (402). The network switch may determine (404) the physical ports on the network switch to which each computing node to be activated is physically connected according to the method of FIG. 4 by identifying the bit number from the least significant bit of the bitmask (402) for each bit having a value of '1.' The bit number for each such bit specifies the physical port on the switch to which a computing node is connected that is to be activated. For example, consider the exemplary bitmask above of '0101.' The value of '1' in the first and third bit indicate that computing nodes connected to ports '1' and '3' of the switch are to be activated.

Identifying (206), by the network switch, a network address (216) for each computing node according to the method of FIG. 4 also includes determining (408), for each computing node, the network address associated with the physical port for that computing node in a network address table (120). As mentioned above, the network address table (120) of FIG. 4 is a data structure that associates network addresses with the switch's physical ports. Each record in the network address table (120) includes a physical port field (122) and a network address field (124). The network switch may determine (408), for each computing node to be activated, the network address associated with the physical port for that computing node in a network address table (120) according to the method of FIG. 4 by looking up each network address in the network address table (120) associated with each physical port specified in the bitmask (402).

Exemplary embodiments of the present invention are described largely in the context of a fully functional computer system for remotely booting computing nodes in a switching domain. Readers of skill in the art will recognize, however, that the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of remotely booting computing nodes in a switching domain, the switching domain capable of connecting to other switching domains through a network switch, the method comprising:
    receiving, in the network switch, a wakeup request packet that requests activation of one or more computing nodes in the switching domain, the wakeup request packet having a process port value that specifies physical ports on the network switch to which the one or more computing nodes are physically connected, wherein the wakeup request packet requests activation of a single computing node in the switching domain;
    identifying, by the network switch, a network address for each computing node to be activated based on the physical port on the network switch to which each computing node to be activated is physically connected, further comprising:
        calculating a remainder of dividing the process port value by a predefined divisor,
        determining whether the remainder specifies a single physical port on the network switch, and
        determining, from a network address table, the network address associated with the physical port specified by the remainder if the remainder specifies a single physical port on the network switch;
    generating, by the network switch, a wakeup packet for each computing node to be activated based on the identified network address for that computing node, each wakeup packet instructing one of the computing nodes to activate; and
    transmitting, by the network switch to each computing node to be activated, the wakeup packet for that computing node.

2. The method of claim 1 wherein:
    the wakeup request packet requests activation of a subset of all computing nodes in the switching domain; and
    identifying, by the network switch, a network address for each computing node to be activated based on the physical port on the network switch to which each computing node to be activated is physically connected further comprises:
        determining a bitmask based on a remainder of dividing the process port value by a predefined divisor,
        determining the physical ports on the network switch to which each computing node is physically connected based on the bitmask, and
        determining, for each computing node, the network address associated with the physical port for that computing node in a network address table.

3. The method of claim 1 wherein:
    the wakeup request packet requests activation of all computing nodes in the switching domain; and
    identifying, by the network switch, a network address for each computing node to be activated based on the physical port on the network switch to which each computing node to be activated is physically connected further comprises:
        calculating a remainder of dividing the process port value by a predefined divisor,
        determining whether the remainder specifies all of the physical ports on the network switch, and
        determining, from a network address table, the network address for each computing node if the remainder specifies all of the physical ports on the network switch.

4. The method of claim 1 further comprising:
    creating, by an administrative computing node in one of the other switching domains, a wakeup request packet; and
    transmitting, by the administrative computing node, the wakeup request packet to the network switch.

5. The method of claim 1 further comprising:
    creating, by an administrative computing node in the switching domain, a wakeup request packet; and
    transmitting, by the administrative computing node, the wakeup request packet to the network switch.

6. Apparatus for remotely booting computing nodes in a switching domain, the switching domain configured to connect to other switching domains through a network switch, the apparatus comprising a computer processor, a computer memory operatively coupled to the computer processor, the computer memory having stored within it computer program instructions for:
    receiving, in the network switch, a wakeup request packet that requests activation of one or more computing nodes in the switching domain, the wakeup request packet having a process port value that specifies physical ports on the network switch to which the one or more computing nodes are physically connected, wherein the wakeup request packet requests activation of a single computing node in the switching domain;
    identifying, by the network switch, a network address for each computing node to be activated based on the physical port on the network switch to which each computing node to be activated is physically connected, further comprising:
        calculating a remainder of dividing the process port value by a predefined divisor, determining whether the remainder specifies a single physical port on the network switch, and determining, from a network address table, the network address associated with the physical port specified by the remainder if the remainder specifies a single physical port on the network switch;

generating, by the network switch, a wakeup packet for each computing node to be activated based on the identified network address for that computing node, each wakeup packet instructing one of the computing nodes to activate; and transmitting, by the network switch to each computing node to be activated, the wakeup packet for that computing node.

7. The apparatus of claim 6 wherein:

the wakeup request packet requests activation of a subset of all computing nodes in the switching domain; and identifying, by the network switch, a network address for each computing node to be activated based on the physical port on the network switch to which each computing node to be activated is physically connected further comprises:

determining a bitmask based on a remainder of dividing the process port value by a predefined divisor, determining the physical ports on the network switch to which each computing node is physically connected based on the bitmask, and determining, for each computing node, the network address associated with the physical port for that computing node in a network address table.

8. The apparatus of claim 6 wherein:

the wakeup request packet requests activation of all computing nodes in the switching domain; and identifying, by the network switch, a network address for each computing node to be activated based on the physical port on the network switch to which each computing node to be activated is physically connected further comprises:

calculating a remainder of dividing the process port value by a predefined divisor, determining whether the remainder specifies all of the physical ports on the network switch, and determining, from a network address table, the network address for each computing node if the remainder specifies all of the physical ports on the network switch.

9. The apparatus of claim 6 wherein the computer memory has stored within in computer program instructions for:

creating, by an administrative computing node in one of the other switching domains, a wakeup request packet; and transmitting, by the administrative computing node, the wakeup request packet to the network switch.

10. The apparatus of claim 6 wherein the computer memory has stored within in computer program instructions for:

creating, by an administrative computing node in the switching domain, a wakeup request packet; and transmitting, by the administrative computing node, the wakeup request packet to the network switch.

11. A computer program product for remotely booting computing nodes in a switching domain;

wherein the computer program product is disposed in a recordable medium, the computer program product comprising computer program instructions for:

receiving, in the network switch, a wakeup request packet that requests activation of one or more computing nodes in the switching domain, the wakeup request packet having a process port value that specifies physical ports on the network switch to which the one or more computing nodes are physically connected, wherein the wakeup request packet requests activation of a single computing node in the switching domain;

identifying, by the network switch, a network address for each computing node to be activated based on the physical port on the network switch to which each computing node to be activated is physically connected, further comprising:

calculating a remainder of dividing the process ort value by a predefined divisor, determining whether the remainder specifies single physical port on the network switch, and determining, from a network address table, the network address associated with the physical port specified by the remainder if the remainder specifies a single physical port on the network switch;

generating, by the network switch, a wakeup packet for each computing node to be activated based on the identified network address for that computing node, each wakeup packet instructing one of the computing nodes to activate; and transmitting, by the network switch to each computing node to be activated, the wakeup packet for that computing node.

12. The computer program product of claim 11 wherein:

the wakeup request packet requests activation of a subset of all computing nodes in the switching domain; and identifying, by the network switch, a network address for each computing node to be activated based on the physical port on the network switch to which each computing node to be activated is physically connected further comprises:

determining a bitmask based on a remainder of dividing the process port value by a predefined divisor, determining the physical ports on the network switch to which each computing node is physically connected based on the bitmask, and determining, for each computing node, the network address associated with the physical port for that computing node in a network address table.

13. The computer program product of claim 11 wherein:

the wakeup request packet requests activation of all computing nodes in the switching domain; and identifying, by the network switch, a network address for each computing node to be activated based on the physical port on the network switch to which each computing node to be activated is physically connected further comprises:

calculating a remainder of dividing the process port value by a predefined divisor, determining whether the remainder specifies all of the physical ports on the network switch, and determining, from a network address table, the network address for each computing node if the remainder specifies all of the physical ports on the network switch.

14. The computer program product of claim 11 further comprising computer program instructions for:

creating, by an administrative computing node in one of the other switching domains, a wakeup request packet; and transmitting, by the administrative computing node, the wakeup request packet to the network switch.

15. The computer program product of claim 11 further comprising computer program instructions for:
creating, by an administrative computing node in the switching domain, a wakeup request packet; and
transmitting, by the administrative computing node, the wakeup request packet to the network switch.

* * * * *